Figure 1:
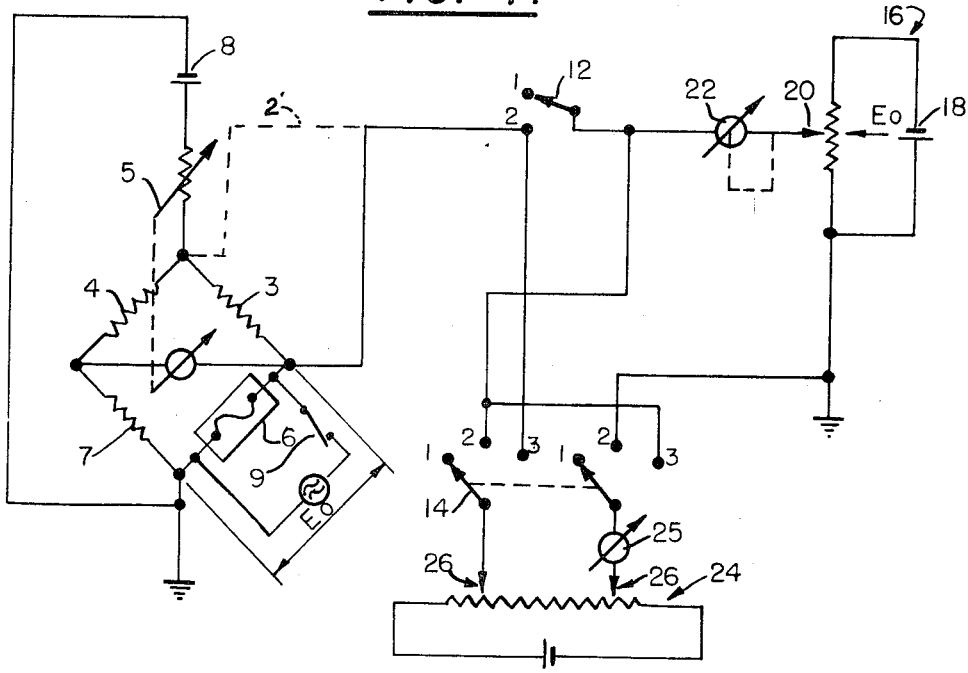

United States Patent [19]

Weinschel

[11] 3,739,269
[45] June 12, 1973

[54] PRECISION SELF-CONTAINED D.C. SUBSTITUTION BRIDGE FOR R.F. MEASUREMENTS

[75] Inventor: Bruno O. Weinschel, Bethesda, Md.

[73] Assignee: Weinschel Engineering Co., Inc., Gaithersburg, Md.

[22] Filed: Oct. 12, 1971

[21] Appl. No.: 187,962

[52] U.S. Cl.................................. 324/106, 324/95
[51] Int. Cl.......................... G01r 5/26, G01r 21/04
[58] Field of Search............... 324/106, 95; 73/355; 250/83.3 H

[56] References Cited
UNITED STATES PATENTS

| | | | |
|---|---|---|---|
| 3,270,282 | 8/1966 | Weinschel | 324/106 |
| 2,577,543 | 12/1951 | Saad | 324/95 |
| 3,142,017 | 7/1964 | Weinschel | 324/106 |
| 3,611,130 | 10/1971 | Larsen et al. | 324/95 |

*Primary Examiner*—Rudolph V. Rolinec
*Assistant Examiner*—Ernest F. Karlsen
*Attorney*—Max L. Libman

[57] ABSTRACT

An improvement is described over the system of U.S. Pat. No. 3,142,017 which shows a substitution bridge circuit using d.c. for measuring ultra-high frequency values and particularly power, but requires an expensive external d.c. voltage measuring device such as a precision potentiometer or a digital voltmeter with an accuracy of 10 microvolts for a 1 volt range. The improved system described herein makes essentially the same measurement but uses an inexpensive memory circuit for remembering a voltage and uses the internal calibrated voltage divider shown in the above patent to obtain the same result without requiring the expensive external d.c. voltage measuring device.

7 Claims, 2 Drawing Figures

PATENTED JUN 12 1973

3,739,269

INVENTOR
Bruno O. Weinschel

BY  *Max L. Libman*

ATTORNEY

PRECISION SELF-CONTAINED D.C. SUBSTITUTION BRIDGE FOR R.F. MEASUREMENTS

The calibration of microwave equipment such as signal generators, receivers, attenuators, etc., is usually accomplished by power measuring devices, since in the frequency range from 100 mc. to 10,000 mc., power can more readily be measured with reasonable accuracy than voltage or current. The invention relates to a generally known type of power measuring circuit in which a thin wire, such as a barretter, or a bead of semiconducting material such as a thermistor absorbs the microwave power. This results in a temperature increase which is a function of the power absorbed, and the temperature dependent resistance change of the heated element is used indirectly to measure the absorbed power, therefore, the temperature coefficient of the resistive material is involved in the resulting microwave indication, and must be taken into consideration. In order to minimize this factor, a known method is commonly used, wherein a certain amount of d.c. or audio frequency bias power at a low frequency down to and including d.c. is introduced into the microwave absorbing resistor element, which is larger than any microwave power to be measured. The resistor element is then placed in a Wheatstone type bridge circuit, and a balance is obtained, with no microwave power present, by varying the low frequency or d.c. bias power. Then the microwave power is fed into the absorbing resistor element, resulting in a bridge unbalance, due to the temperature dependent change in resistance of the element because of the added r.f. power. The d.c. or low frequency bias power is then decreased to bring the bridge back into balance, that is, to a point where the resistance of the absorbing element is the same as it was before the microwave power was fed to it. It is then assumed that the change in average resistance for an equal amount of low frequency power and microwave power dissipated within the heated element is nearly the same except for the substitution error (1) (2); hence, the amount of low frequency bias power which was withdrawn to obtain re-balance must be nearly equal to the amount of microwave power which the resistance element absorbed; therefore, the value of the change in low frequency power for the two conditions of balance is a measure of the r.f. power.

An improved system of the above type is shown in U.S. Pat. No. 3,142,017; however, this system requires the use of a relatively expensive external d.c. voltage measuring device such as a precision potentiometer or a digital voltmeter with an accuracy of 10 microvolts for a 1 volt range. The present invention enables essentially the same measurement to be make, but uses an inexpensive memory circuit for remembering a voltage and uses the internal calibrated voltage divider of the above U.S. Pat. No. 3,142,017 to obtain the same result without requiring the expensive external d.c. voltage measuring device.

Figure 2:
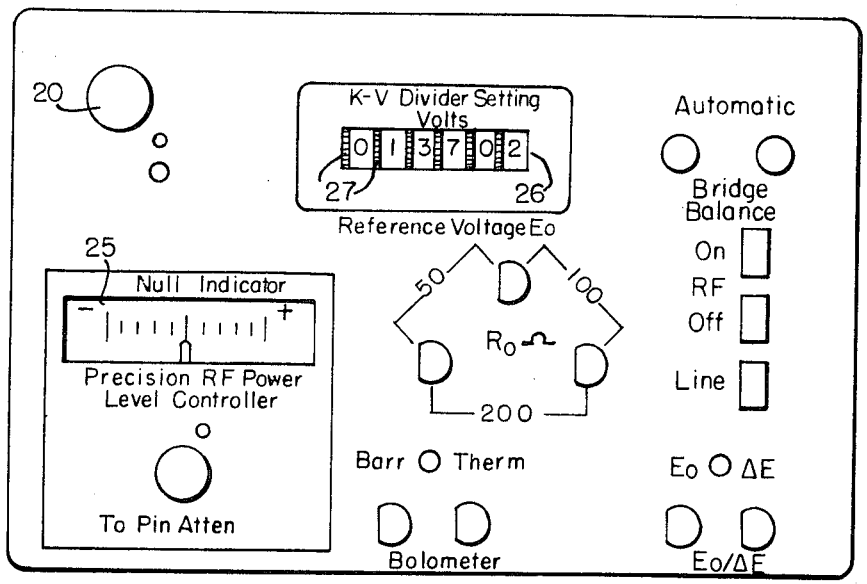

The specific nature of the invention, as well as other objects and advantages thereof, will clearly appear from a description of a preferred embodiment, as shown in the accompanying drawing in which:

FIG. 1 is a schematic simplified circuit diagram showing the principle of operation of the invention; and FIG. 2 is a view of a front panel for an instrument embodying the invention, showing the major controls required.

Referring to FIG. 1, the basic bridge circuit is indicated at 2, as comprising arms 3, 4, 6 and 7. Arm 6 is the bolometer element, which is the r.f. power detecting part of the bridge. The bridge is initially maintained in balance automatically, by known and commercially available automatic re-balancing circuitry generally indicated at 5, by applying power from d.c. source 8 initially without r.f., that is, with switch 9 open, and switches 12 and 14 also open. In this balanced condition and only d.c. applied to the bridge, switch 12 is closed by operating it to position 2, and balancing the voltage drop across arm 6 of the bridge against the output of the "voltage memory" circuit 16, which is known as a potentiometer having a stable voltage source 18 and a slider 20 which is adjusted until the galvanometer 22 shows zero, at which time the output voltage of the potentiometer will be the same as the voltage drop across the bridge arm 6. This voltage will be designated $E_o$. This memory can take many other forms. It could be self-balancing instead of manually balanced. The memory itself could be a large, stable capacitor fed by a suitable Boffer amplifier.

Switch 12 is now reset to position 1, that is, the open position, and switch 14, which has been opened during the preceding step, is now set to position 2, thus putting the precision calibrated potentiometer 24 in a position to measure the voltage drop $E_o$ which is still being retained by potentiometer 16. Precision potentiometer 24 is a highly accurate measuring device, and is also used in the circuit of U.S. Pat. No. 3,142,017 previously referred to, as an integral part of the system. This potentiometer is now operated to measure $E_o$, and the value of $E_o$ thus obtained is then recorded by the operator for use as will be explained below. Switch 9 is now closed which applies r.f. to the bolometer, and the bridge is again re-balanced automatically, which causes a change in the voltage drop across arm 6 of the bridge, as fully explained in the above Patent. If this change is called $\Delta E$, the d.c. substituted power in the r.f. mount 6 is then given by $$P_{sub} = \Delta E \, (2E_o + \Delta E)/R_o.$$

Equal results can be obtained by connecting the d.c. readout and memory circuits, not to the junction of resistors 3 and 6, but to the junction of resistors 4 and 7. If resistors 3, 4 and 7 are of equal value, proportional results are obtained by connecting the d.c. readout and memory circuits to the junction of resistors 4 and 3. This doubles the measured value of $E_o$. If resistors 3, 4 and 7 are alike, this changes $P_{sub}$ to:

$$P_{sub} = \Delta E \, (2E_o + \Delta E)/4R_o.$$

It will be seen from the above that in order to measure the r.f. power, it is necessary to obtain the values of $E_o$ and $\Delta E$. In addition, the calibration factor (3) of the bolometer mount is also required, but this is independently determined and is not a part of the present test.

It will be apparent from the above that the value $E_o$ has been stored in the "Memory" device 16, so that after r.f. power has been applied to the bridge, by moving switch 14 to position No. 3, the difference in voltage between the original value $E_o$ and the new value can be obtained directly by adjusting the Kelvin-Varley potentiometer 24 to measure this difference. The memory voltage device can be a relatively inexpensive multi-turn potentiometer with range switches for coarse control and a stable voltage source 18, and a null detector 22 which may be a relatively inexpensive galvanometer type device.

The Kelvin-Varley circuit 24 can be balanced manually by the operator, and the reading taken directly from digital dials usually associated with the modern type of this instrument, or alternatively, the dials could be mechanically coupled to extra switch decks for external printers or transmission of these values in decimal form to an external computer, if desired, but of course, this would require somewhat more expensive equipment. The Kelvin-Varley circuit may also, in a still more sophisticated and expensive variation, employ automatic balancing means and provide a readout which is automatic and direct on digital panel indicators. However, all of these versions reflect only improvements in the convenience of the user, which can be provided at additional cost if desired. In a more expensive version of this device, the manually adjusted Kelvin-Varley potentiometer can be replaced by any self-balancing, bucking circuit the automatic, digital readout.

FIG. 2 shows the front view of a control panel for a practical embodiment of this device, wherein the various control knobs are given the same reference characters as the elements of FIG. 1 to which they correspond or which they control. For example, the setting of memory control device 20 in FIG. 1 is controlled by knob 20 on the panel; the setting of the Kelvin-Varley circuit is controlled by the series of digit wheels 26 which are manually rotated by the operator by means of the serrations or thumb wheels 27 to thereby adjust the resistance setting until the null indicator 25 is at the zero setting, at which time the reading of the digital dials gives the correct value of the volts being measured. The other elements on the panel are self-explanatory.

I claim:

1. a. Apparatus for measuring r.f. power comprising a bridge circuit, one arm of which includes a bolometric resistor having a substantial temperature coefficient of resistivity, b. means for supplying low frequency bias power to said bridge from a bias source, c. means for adjusting the bias power from said source applied to said bridge until the bridge is in balance, d. a stable voltage memory device for providing and retaining independently of the bridge a voltage proportional to the voltage drop across one arm of said bridge when the bridge is thus balanced, e. precision voltage measuring means, and means for connecting said precision voltage measuring means to said stable voltage memory device to measure the voltage retained in said memory device and thus obtain an initial voltage value, f. means for supplying r.f. power to be measured to said bolometric resistor and thereby unbalancing the bridge, said means for adjusting serving to re-balance the bridge with bias power from said low frequency source and thereby establish a new value of voltage drop across said one arm of said bridge, g. means for opposing said new value of voltage to the output of the voltage memory device, h. and further means for connecting said precision means to directly measure the voltage difference between said new value of voltage and the voltage stored in the voltage memory device.

2. The invention according to claim 1, said stable memory device being an adjustable potentiometer with a stable d.c. voltage source.

3. The invention according to claim 1, said bridge being an automatic re-balancing bridge and said precision potentiometer being a Kelvin-Varley potentiometer.

4. The invention according to claim 1, said precision voltage measuring device having an adjustable calibrated output tap, and means for opposing said retained voltage of said voltage memory device to the output of said precision voltage measuring device and adjusting said adjustable tap until the potential output equals said retained voltage value to obtain a measurement of said voltage value.

5. Apparatus for measuring r.f. power comprising a bridge circuit, one arm of which includes a bolometric resistor having a substantial temperature coefficient of resistivity, b. means for supplying low frequency bias power to said bridge from a bias source, c. means for adjusting the bias power from said source applied to said bridge until the bridge is in balance, d. a stable voltage memory device independent of said bridge and means for temporarily connecting said memory device to said balanced bridge and supplying it with a voltage proportional to the voltage drop across one arm of the thus balanced bridge, e. precision voltage measuring means, and means for connecting said precision voltage measuring means to said stable voltage memory device to measure the voltage retained in said memory device and thus obtain an initial voltage value, f. means for supplying r.f. power to be measured to said bolometric resistor and thereby unbalancing the bridge, said means for adjusting serving to re-balance the bridge with bias power from said low frequency source and thereby establish a new value of voltage drop across said one arm of said bridge, g. means for opposing said new value of voltage to the output of the voltage memory device, h. and further means for connecting said precision means to directly measure the voltage difference between said new value of voltage and the voltage stored in the voltage memory device.

6. The invention according to claim 5, said stable memory device being an adjustable potentiometer with a stable d.c. voltage source.

7. The invention according to claim 5 said precision voltage measuring device having an adjustable calibrated output tap, and means for opposing said supplied voltage of said voltage memory device to the output of said precision voltage measuring device and adjusting said adjustable tap until the potential output equals said supplied voltage value to obtain a measurement of said voltage value.

* * * * *